Patented Jan. 11, 1938

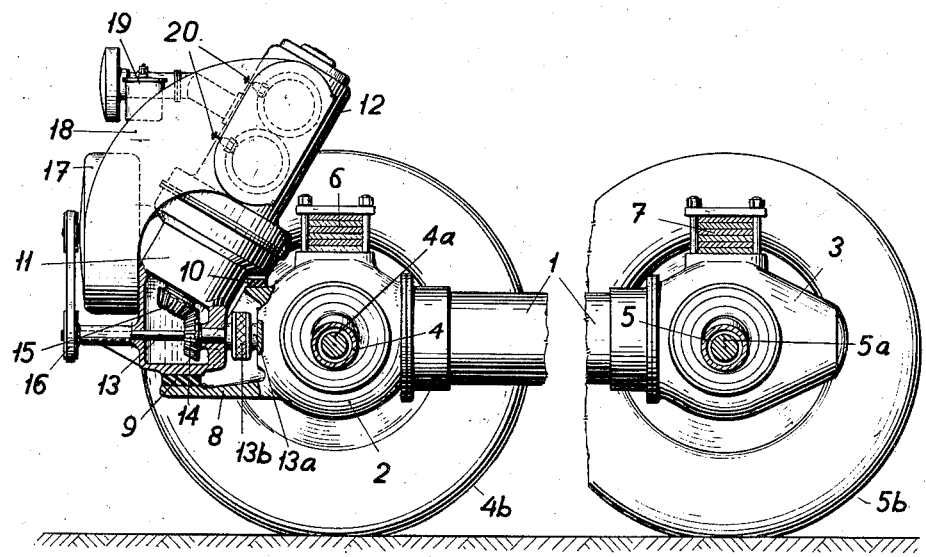

2,105,153

UNITED STATES PATENT OFFICE 2,105,153

MOTOR VEHICLE CHASSIS

Hans Ledwinka, Koprivnice, Czechoslovakia

Application April 6, 1937, Serial No. 135,335
In Czechoslovakia March 27, 1936

2 Claims. (Cl. 180—54)

In motor vehicles, especially those having wheel-carrying members, for example half axles, pivoted to a central supporting member, considerable difficulties are caused by the mounting of the engine, firstly by the fact that the engine and change-speed gear must be mounted either in front of the front axle or behind the back axle, the length of the vehicle thereby becoming excessive, and secondly by the fact that, due to the engine and change-speed gear being flanged directly on to the central supporting member or to the axle casing, all the engine vibrations are transmitted in an unpleasant manner to the entire vehicle. The aforesaid excessive length of vehicle may, however, be reduced to a certain extent by the use of an engine having its cylinders lying opposite one another in one plane. It is true that the engine and change-speed gear may also be arranged between the two axles, but useful vehicle space is then lost, the engine itself becomes difficult of access, the transmission of vibration can only be prevented with difficulty and finally in the case of multi-axle drive, the connection between the change-speed gear and the driving shaft passing through the chassis supporting member can only be carried out with great difficulty.

In order to obviate the disadvantages enumerated in the foregoing and at the same time to secure noiseless running of the vehicle, the chassis member or the axle casing is extended according to the invention in front of the front axle or behind the rear axle of the vehicle to form a bracket on which the engine and change-speed gear are mounted, preferably with the interposition of noise and vibration absorbing rubber members or the like, in such a manner that the shortest dimension of this unit lies in the direction of the length of the vehicle.

The drive of the longitudinal driving shaft of the chassis or of the axle gear is effected by means of an auxiliary shaft forming a continuation of the longitudinal shaft and expediently connected to it by a flexible coupling. The auxiliary shaft is a component of the change-speed gear and is driven by an intermediate gear, constructed in accordance with the position of the engine axis and of the change-speed gear box relatively to the position of the main longitudinal shaft and of the auxiliary shaft. The auxiliary shaft may be used at the same time for driving auxiliary members of the unit, such as the fan, the blower in the case of air-cooled engines, the dynamo and the like.

A constructional example of the invention is shown semi-diagrammatically in side elevation, partly in section, in the accompanying drawing.

To the ends of a tubular central supporting member 1 are connected axle casings 2 and 3 for the pivotal connection of half axles 4 and 5 and for the drive of the axle shafts 4a and 5a. Transverse springs 6 and 7 for supporting the wheels 4b, 5b are also connected to the casings 2 and 3. The casing 2, which may be situated at the front end of the vehicle is provided with a bracket 8 or the like, on which the change-speed gear 11 rests with the interposition of rubber shock and noise absorbing members 9 and 10 or the like. The engine 12 is rigidly secured to the gear 11. The engine is in the form of a four-cylinder engine with horizontal pairs of cylinders lying opposite each other, and the axes of the engine and of the change-speed gear are inclined upwardly towards the axle casing so as to secure the minimum possible length of vehicle. The position of the engine and of the points of support 9 and 10 is preferably selected so that the centre of gravity of the engine gear unit lies above the supported surface.

Journalled in the gear casing 11 is an auxiliary shaft 13 driven by a bevel gear 14, 15. The auxiliary shaft 13 is co-axial with the main shaft 13a journalled in the chassis or in the axle casing 2 and the two shafts are connected together by employing a flexible coupling or the like 13b.

The free end of the auxiliary shaft 13 may be employed for driving various auxiliary devices. In the constructional example, the end of the shaft 13 carries a belt pulley 16 for driving a blower 17 by means of which cooling air is sent to the cylinders of the engine 12 through the ducts 18 made of sheet metal or the like. The carburetter is indicated by the reference number 19 and the spark plugs by 20.

The driving arrangement described is applicable to a variety of vehicle constructions. Thus, for example, the arrangement may be employed for the individual drive of the axle which is immediately adjacent it and which carries it. The engine may, however, be mounted on the central portion of a non-driven axle, for example the front axle and may drive a remote axle, for example the back axle. It is furthermore also possible to employ the construction illustrated as a four-wheeled driving unit or bogey unit.

In place of the swinging half axles assumed in the constructional example, the wheels may be supported independently of each other in some other way, for example by a jointed quadrangle or the like. It is furthermore conceivable to connect the axles rigidly to the axle casing.

I claim:

1. A motor vehicle chassis comprising a bracket-like extension extending away from the centre of the vehicle beyond one of the axles and on which the engine and change-speed-gear are mounted, the latter comprising an auxiliary shaft driven by means of an intermediate gear and lying in alignment with the longitudinal driving shaft of the vehicle, said auxiliary shaft being connected at one end to said driving shaft and at the other end being provided with means for driving an auxiliary mechanism.

2. In a motor vehicle chassis comprising wheel carrying members pivoted to an axle casing, a bracket-like extension fixed to said axle casing and extending away from the centre of the vehicle, and an engine and change-speed-gear connected to said axle casing and extension at a plurality of points, one of said points being near the top of said axle casing.

HANS LEDWINKA.